United States Patent
Horton et al.

(10) Patent No.: US 8,067,343 B2
(45) Date of Patent: Nov. 29, 2011

(54) METHODS AND COMPOSITIONS FOR PREVENTING HIGH DENSITY WELL COMPLETION FLUID LOSS

(75) Inventors: Robert L. Horton, Sugar Land, TX (US); Bethicia B. Prasek, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 12/667,881

(22) PCT Filed: Jul. 1, 2008

(86) PCT No.: PCT/US2008/068885
§ 371 (c)(1),
(2), (4) Date: Mar. 29, 2010

(87) PCT Pub. No.: WO2009/009343
PCT Pub. Date: Jan. 15, 2009

(65) Prior Publication Data
US 2010/0210486 A1 Aug. 19, 2010

Related U.S. Application Data

(60) Provisional application No. 60/948,833, filed on Jul. 10, 2007.

(51) Int. Cl.
*C09K 8/60* (2006.01)
*C09K 8/588* (2006.01)
*E21B 43/16* (2006.01)

(52) U.S. Cl. ............... 507/219; 166/305.1; 507/221; 507/225; 507/230

(58) Field of Classification Search .......... 507/219, 507/221, 225, 230; 166/305.1
See application file for complete search history.

(56) References Cited

U.S. PATENT DOCUMENTS

| | | | |
|---|---|---|---|
| 4,499,232 A | 2/1985 | Engelhardt et al. | |
| 4,624,795 A | 11/1986 | Dawson et al. | |
| 5,304,620 A | 4/1994 | Holtmyer et al. | |
| 5,439,057 A | 8/1995 | Weaver et al. | |
| 5,680,900 A | 10/1997 | Nguyen et al. | |
| 5,996,694 A | 12/1999 | Dewprashad et al. | |
| 7,098,172 B1 | 8/2006 | Horton et al. | |
| 2001/0009890 A1* | 7/2001 | Patel et al. ............ | 507/138 |
| 2003/0029616 A1 | 2/2003 | Maberry et al. | |
| 2004/0138070 A1 | 7/2004 | Jones et al. | |
| 2004/0256099 A1* | 12/2004 | Nguyen et al. ........ | 166/249 |
| 2005/0049328 A1* | 3/2005 | Schmiedel et al. ...... | 523/218 |
| 2006/0116296 A1* | 6/2006 | Kippie et al. .......... | 507/244 |
| 2007/0049501 A1 | 3/2007 | Saini et al. | |

FOREIGN PATENT DOCUMENTS

WO  2007005499 A1  1/2007

OTHER PUBLICATIONS

International Search Report from PCT/US2008/068885 dated Mar. 26, 2009 (3 pages).
Written Opinion from PCT/US2008/068885 dated Mar. 26, 2009 (6 pages).
Office Action issued in Eurasian Application No. 201070120 dated Mar. 30, 2011 (6 pages).
Office Action cited in corresponding Canadian Application No. 2,692,794 dated May 30, 2011 (3 pages).
Office Action that issued in corresponding Australian Application No. 2008275384 dated Feb. 22, 2011 (2 pages).
Office Action issued in corresponding European Application No. 08772295.5 dated Mar. 1, 2011 (8 pages).

\* cited by examiner

*Primary Examiner* — Timothy J. Kugel
(74) *Attorney, Agent, or Firm* — Osha • Liang LLP

(57) ABSTRACT

A method of reducing fluid loss from a wellbore that includes emplacing a fluid loss pill in the wellbore, the fluid loss pill comprising: a base fluid; a hydratable or solvatable synthetic copolymer having at least one crosslinkable comonomer; and a crosslinking agent is disclosed.

30 Claims, No Drawings

METHODS AND COMPOSITIONS FOR PREVENTING HIGH DENSITY WELL COMPLETION FLUID LOSS

BACKGROUND OF INVENTION

1. Field of the Invention

Embodiments disclosed herein relate generally to methods and compositions for controlling fluid loss in a wellbore.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As stated above, wellbore fluids are circulated downhole to remove rock as well as deliver agents to combat the variety of issues described above. Fluid compositions may be water- or oil-based and may comprise weighting agents, surfactants, proppants, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular.

In attempting to cure these and other problems, crosslinkable or absorbing polymers, loss control material (LCM) pills, and cement squeezes have been employed. These additives have found utility in preventing mud loss, stabilizing and strengthening the wellbore, and zone isolation and water shutoff treatments. Some typical viscosifying additives used in well fluids to combat fluid loss include natural polymers and derivatives thereof such as xanthan gum and hydroxyethyl cellulose (HEC). In addition, a wide variety of polysaccharides and polysaccharide derivatives may be used, as is known in the art.

Further, providing effective fluid loss control without damaging formation permeability in completion operations has been a prime requirement for an ideal fluid loss-control pill. Conventional fluid loss control pills include oil-soluble resins, calcium carbonate, and graded salt fluid loss additives, which have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can significantly reduce production levels if the formation permeability is not restored to its original level. Further, at a suitable point in the completion operation, the filter cake must be removed to restore the formation's permeability, preferably to its original level.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

While various natural and synthetic polymers are commonly added to wellbore fluids to control fluid loss from the fluids into subterranean formations, some wellbores into which the water-based fluids are pumped have relatively high downhole temperatures and/or pressures at which traditional fluid loss control agents are unstable. As such, those fluid loss control agents may fail to serve their purpose of providing fluid loss control downhole.

Accordingly, there exists a continuing need for improvements in fluid loss agents used in various wellbore operations.

SUMMARY OF INVENTION

In one aspect, embodiments disclosed herein relate to a method of reducing fluid loss from a wellbore that includes emplacing a fluid loss pill in the wellbore, the fluid loss pill comprising: a base fluid; a hydratable or solvatable synthetic copolymer having at least one crosslinkable comonomer; and a crosslinking agent.

In another aspect, embodiments disclosed herein relate to a fluid loss pill that includes a crosslinked gelled composition, comprising: a base fluid; a hydratable or solvatable synthetic copolymer having at least one crosslinkable comonomer; and a crosslinking agent.

In yet another aspect, embodiments disclosed herein relate to a method of treating a wellbore through a permeable subterranean formation that includes preparing a crosslinked aqueous gelled composition comprised of an aqueous salt solution having a density in the range of from about 11 to about 21.5 pounds per gallon, a hydratable and crosslinkable synthetic copolymer having as a comonomer a vinyl phosphonic acid or derivative thereof and a crosslinking agent; emplacing the high density cross-linked aqueous gelled composition in the wellbore in an amount sufficient to fill the portion of the wellbore within the permeable subterranean formation; and emplacing a high density completion fluid in the wellbore behind the high density cross-linked gelled composition therein whereby the cross-linked gelled composition prevents the completion fluid from being lost into the permeable subterranean formation.

Other aspects and advantages of the invention will be apparent from the following description and the appended claims.

DETAILED DESCRIPTION

In one aspect, embodiments disclosed herein are generally related to compositions and processes for increasing fluid loss control in downhole applications. In particular, embodiments of the present disclosure relate to the use of crosslinkable and hydratable or solvatable synthetic polymers having as at least one comonomer, a crosslinkable comonomer such as vinyl phosphonic acid, etc. In order to prevent fluid loss in a wellbore, a gelled composition including such crosslinkable and hydratable or solvatable synthetic polymer, a crosslinking agent, and a base fluid may be formed and pumped downhole.

As used herein, the term "synthetic polymer" refers to polymers which are industrially formed synthetic precursors, as compared to natural or biopolymers (pure or chemically modified) that are or are formed from naturally occurring species. As used herein, the term "solvatable" (or "hydratable") refers to polymers, which when added to a base fluid or solvent, form an aggregation of the polymer with one or more base fluid molecules (in particular water when referring to hydratable). Thus, synthetic polymers finding particular use in the pills of the present disclosure include solvatable or hydratable synthetic polymers, which are polymers containing, in sufficient concentration and reactive position, one or more monomeric units or functional groups that may interact with the base fluid molecules to render the polymer solvated or hydrated. One of ordinary skill in the art would appreciate that depending on the type of base fluid selected, the type of comonomer that renders the polymer solvatable or hydratable in the base fluid may be selected.

Thus, where the base fluid is non-polar, for example an aliphatic hydrocarbon, the synthetic polymer may contain non-polar species, for example the polymer chain may be formed from a long chain ester of acrylic or methacrylic acid, a vinyl ester of a long chain acid, a vinyl alkyl ether, ethylene, propylene, butadiene or isoprene, a hydroxyl group-containing long chain fatty acid, poly-t-butyl styrene terminated with amine, hydroxyl, carboxyl or unsaturated groups, or polyisobutylene, polybutadiene or polyisoprene terminated with amine, hydroxyl or carboxyl groups. Where the base fluid includes aromatic hydrocarbons, somewhat shorter chain analogs of these polymers may be employed, such as polymers of methyl or ethoxyethyl methacrylate, ethyl acrylate, styrene or vinyl toluene. Where the base fluid is weakly polar, e.g., a higher alcohol, ketone or ester, suitable solvatable components include aliphatic polyethers, polyesters from short-chain difunctional acids and alcohols, short-chain alcohol esters of acrylic or methacrylic acids, and polymers of short-chain hydroxy-acids. If a strongly polar base fluid is used, such as methanol, ethanol, glycols, the solvatable components may consist of polymers of acrylic or methacrylic acids, ethylene oxide or vinyl pyrrolidone, polyvinyl alcohol or polymers of glycerol or glycol monomethacrylates. Further, if an aqueous base fluid is used, the synthetic polymer may be formed from comonomers possessing functional groups such as hydroxyl, cishydroxyl, carboxyl, sulfate, sulfonate, amino or amide, so as to provide hydration of the polymer when in an aqueous environment.

Further examples of such synthetic polymers hydratable in an aqueous base fluid that may find use in the pills of the present disclosure include poly(ethylene glycol) (PEG), poly(diallyl amine), poly(acrylamide), poly(acrylonitrile), poly(aminomethylpropylsulfonate[AMPS]), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

Further, so as to allow for crosslinking in accordance with the present disclosure, the synthetic polymer may be a copolymer possessing at least one comonomer capable of crosslinking in its polymer structure, either by copolymerization, grafting, or other means known in the art. Suitable comonomers that may be used to form the copolymer of the present disclosure may include those compounds having the general structure:

where R is an olefinically unsaturated hydrocarbon, and X is a functional group capable of crosslinking. In a particular embodiment, R may be an olefinically unsaturated hydrocarbon represented by any of the following general structures:

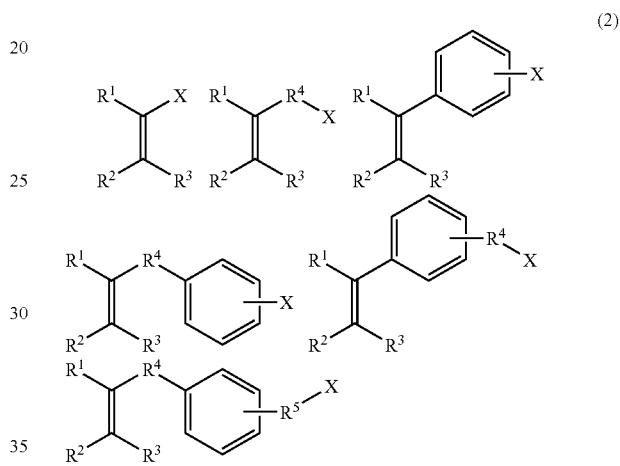

where $R^1$-$R^3$ may individually be selected from a hydrogen or $C_1$-$C_{30}$ alkyl, aryl, or aralkyl groups, or $(EO)_1$-$(EO)_{30}$, $(PO)_1$-$(PO)_{30}$ groups or mixed EO-PO oligomer groups capped with a hydrogen or $C_1$-$C_{30}$ alkyl, aryl, or aralkyl groups, where EO and PO are ethylene oxide and propylene oxide, respectively, and where $R^4$-$R^5$ may individually be selected from a $C_1$-$C_{30}$ alkylene, arylene, or aralkylene groups, or $(EO)_1$-$(EO)_{30}$, $(PO)_1$-$(PO)_{30}$ groups or mixed EO-PO oligomer groups. In a particular embodiment, $R^1$ may be a hydrogen or a methyl, ethyl, propyl, butyl, or phenyl group.

In a particular embodiment, X may be a functional group capable of crosslinking represented by the general formula —$B(O)_n(OR)_m$ or —$OB(O)_n(OR)_m$ where B may be any heteroatom, including for example P, S, Se, and As, or carbon, n may be 0-2, m may be 1-2, and R may be H, $C_1$-$C_{30}$ alkyl, aryl, or aralkyl groups, or $(EO)_1$-$(EO)_{30}$, $(PO)_1$-$(PO)_{30}$ groups or mixed EO-PO oligomer groups. For example, suitable crosslinking agents may include vinyl phosphonic acid, vinyl phosphoric acid, vinyl sulfonic acid, vinyl sulfuric acid, vinyl arsonic acid, vinyl arsenic acid, vinyl selenonic acid, vinyl selenic acid, vinyl benzoic acid, acrylic acid, or derivatives thereof, including salts and esters (mono or bis) derivatives thereof and styrene derivatives thereof. Examples of such vinyl phosphonic acids include, but are not limited to, vinylphosphonic acid, 1-phenylvinyl phosphonic acid, halogenated 1-phenylvinyl phosphonic acids, 1-methylvinyl phosphonic acid, 1-ethylvinyl phosphonic acid, mixtures thereof, and derivatives thereof, including salts and esters (mono or bis) derivatives thereof. In a particular embodiment, the crosslinking monomer may preferably contain a functional group represented by —B(O)$_n$(OR)$_m$ as the —C—B linkage may be more thermally stable than the —C—O—B linkage in —OB(O)$_n$(OR)$_m$.

In a particular embodiment, the amount of the "crosslinking" comonomer may range from 0.05 to 15 percent by weight of the polymer, 0.1 to 5 weight percent in other embodiments, and 0.5 to 2 weight percent in yet other embodiments. However, one of ordinary skill in the art would appreciate that sufficient or appreciable crosslinking may occur in various other embodiments with either greater or less amounts of such a comonomer.

Further, while specific polymers and monomer components may be described herein, one of ordinary skill in the art would appreciate that other chemical compositions may be used. Specifically, one of ordinary skill in the art would appreciate that a polymer possessing sufficient affinity to the absorption of water and ability to crosslink may be achieved by providing the polymer with sufficient amounts of the appropriate comonomer species.

Upon selection of the appropriate polymer to be incorporated into a fluid loss pill of the present disclosure, solvation or hydration and crosslinking may occur, the latter through the assistance of a crosslinking agent. One of ordinary skill in the art would appreciate that depending on the type of base fluid, and type of synthetic polymer used, the crosslinking agent may vary. Examples of crosslinking activators or agents that may be used in accordance with the present disclosure include, for example, Bronsted-Lowry or Lewis bases which may, in one embodiment, generally be substantially free of polyvalent metal ions that is, metal ions having more than one valence state. Suitable compounds include, for example, calcium oxide, magnesium oxide and compounds selected from the group of mono-, di- and tri-alkanol amines such as triethanolamine, sodium hydroxide, potassium hydroxide, ammonia, various cocoamines such as Bis(2-hydroxyethyl) cocoamine, various pentamines such as tetraethylenepentamine, and various other water-soluble amines, such as propyldiethanolamine, triethylamine, various water-soluble borates, admixtures of boric acid and borate salts, and the like in the presence of a divalent cation, such as calcium or magnesium, which is present in at least a trace amount and which may be present in the aqueous liquid utilized to hydrate the copolymer or added as an additional component to the aqueous liquid. In other embodiments, the crosslinking agent, various divalent cations suitable for crosslinking may be present in an aqueous base fluid, e.g., a brine or other aqueous fluid, itself, such that no additional crosslinking agent is required. Such compounds generally are substantially free of polyvalent metal ions, that is, metal ions having more than one valence state.

In a particular embodiment, the crosslinking agent may be magnesium oxide. As a result of the limited solubility of magnesium oxide in an aqueous solution, the rate of crosslink development is retarded or delayed such that a gelled fluid may be readily pumped into a wellbore for entry into a subterranean formation before significant crosslinking occurs in the fluid. However, one of ordinary skill in the art would appreciate that for crosslinking agents that may have faster rates of crosslinking, additional delay may be provided by sequentially pumping the various components such that crosslinking is not begun until the components interact downhole.

One suitable form of magnesium oxide is a very fine powder is a highly reactive form, i.e., having small particle size, high surface area, and ready accessibility for reaction. One example of such a fine powder magnesium oxide is available commercially from M-I LLC under the trade name of DI-BALANCE™. One useful feature of the magnesium oxide system is that the crosslinking does not occur immediately, but instead occurs over the course of several hours, leading to doubling of the apparent viscosity of the mixture during the first part of an hour and gradually increasing to about 50 percent of its ultimate value upon sitting for several hours at room temperature.

Further, in other embodiments, other compounds for crosslinking the synthetic polymers of the present disclosure may be used such as, for example, titanium or zirconium. Thus, the crosslinking agent can be any convenient source of zirconium or titanium ions, including zirconium chelates such as zirconium lactate, zirconyl chloride, sodium zirconium lactate, and zirconium acetylacetonate. A delay component, such as the sodium counterpart of these zirconium compounds, may also be provided.

When an oil base fluid and oil-solvatable polymer is desired, an organic soluble crosslinking agent may be selected, such as a quaternized organic amine, in particular a poly-quaternized amine, such as a di-, tri-, or tetra-quaternized amine, which may be formed by quaternizing an organic polyamine. For example, amine groups may be quaternized with virtually any organic acid including formic, acetic, propionic, butyric, as well as longer chained fatty acids and the aromatic organic acids such as particularly benzoic acid. Among the inorganic acids which may be utilized to quaternize the amines are hydrochloric, sulfuric and phosphoric acids. Further, materials such as dialkyl sulfates and alkyl chlorides may also be employed to quaternize the amines with the most preferred being dimethyl sulfate and methyl chloride. For example, tris(chloromethyl)ethane may be reacted with an excess trialkyl amine such that the amine groups replace each chloro group and form a tri-quaternized amine. In another example, a bis- or tris-(dialkylamino)alkane, such as bis-(dimethylamino)butane or bis-(dimethylamino)hexane may be quaternized, for example with an alkyl halide, such as methyl bromide. Further, one of ordinary skill in the art would appreciate that the oil-solubility of the crosslinking agent may be increased by increasing the number of carbon atoms in the polyamine, such as by using a tri(t-butyl)amine or tribenzyl amine in the above example instead of a trimethyl amine.

Water-based pills may have an aqueous fluid as the base fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

For example, the solution may include zinc halides, such as zinc bromide or zinc chloride or both, and/or calcium halides, such as calcium bromide or calcium chloride or both. Alternatively, formate-based brines may be used. The brine solution may include the salts in conventional amounts, generally ranging from about 1% to about 80%, and preferably from about 20% to about 60%, based on the total weight of the solution, although as the skilled artisan will appreciate, amounts outside of this range can be used as well.

Further, embodiments of the present invention may further use "specialty" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate. Specifically, these specialty brine solutions (which are typically used in high temperature applications) comprise aqueous solutions of transition metal salts, wherein the aqueous solution contains anionic moieties having the formula $[A^{n+}B_mO_k]^{x-}$, where (A) is selected from group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, and where the cations may be lithium, sodium, potassium, cesium, or a mixture thereof, or with a small amount of hydrogen cations provided by free acid anionic moieties, and especially where said salts are a major component of the solution and not merely an additive thereto. In particular embodiments of the present invention may use, the sodium, potassium, and cesium salts of the heteropolytungstates and the blends of these salts with heteropolytungstic acids. Specific examples of such brines may be found in PCT International Publication No. WO2007/005499, which is assigned to the present assignee and incorporated by reference herein in its entirety.

Further, it is also noted that the ultimate density of the fluid loss pill may be controlled by incorporating solid salt particles therein, such as described in PCT International Publication No. WO2007/005499, which is assigned to the present assignee and incorporated by reference herein in its entirety. For example, fluid control pills in accordance with embodiments of the present invention may have densities ranging from 11 ppg to about 35 ppg depending on the volume fraction of salt particle and the salt density, as taught by WO2007/005499.

For the preparation of a fluid loss pill, it is obvious that a high density base brine may be selected as a starting point for the formulation of the pill. The base brine should be selected from those which are compatible with the polymer/crosslinkant system which has been selected; or alternatively, the polymer/crosslinkant system should be selected from those which are compatible with the brine which has been selected. For the preparation of a high density fluid loss pill, as described in WO2007/005499, a salt may also be selected from those which are relatively dense and highly soluble in dilute acid, formation waters, or fresh water and which are substantially insoluble in the selected base brine. Alternatively, the brine may be pre-saturated with the selected salt, thereby rendering any further added salt as substantially insoluble in the pre-saturated base brine.

An oil-based pill may include an oleaginous base fluid, which may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The pills may also be formed in a weakly polar base fluid, e.g., a higher alcohol, ketone or ester, or a strongly polar base fluid, such as methanol, ethanol, glycols, and other water-miscible polar solvents.

One method for forming a fluid loss pill in accordance with one embodiment of the present disclosure is now described. First, a synthetic polymer possessing an amount of vinyl phosphonic acid sufficient to provide crosslinking and an amount of another comonomer sufficient to provide hydration is dispersed/mixed in a selected volume of base fluid, such as a brine. In selected embodiments, the pH of the brine is set to be between about 5 to about 7. One of ordinary skill in the art would appreciate the pH of brine can be adjusted with lime or hydrochloric or hydrobromic acid, as necessary.

When hydration is desired, the pH of the pill is adjusted to below 0.5 by using hydrochloric acid. The gel is allowed to develop viscosity and allowed to hydrate until fully hydrated and yielded as evidenced by no more visual change of gel viscosity. While allowing the gel to hydrate, MgO may be prepared for addition to the gel. Using a volume of the brine previously selected, a brine/MgO slurry may be formed. The addition of brine aids in dispersion of the crosslinkant (or crosslink activator in case the brine is a dense non-magnesium-containing, divalent-cation-containing brine, inasmuch as there are far more other divalent cations than magnesium ions in the final pill, so the MgO should be considered as an activator which allows the pH to rise and enables the predominantly abundant divalent cations to effect the crosslink).

Once the polymer is fully hydrated, the MgO slurry may be slowly added to the viscosified polymer so that the MgO may be evenly dispersed therein. If sufficient crosslinking has not begun to occur within 30 minutes, slurry an additional 25% more MgO for addition. Crosslinking may not necessarily occur immediately, but over the course of several hours, leading to the doubling of the apparent viscosity of the mixture during these several hours. Thereafter the apparent viscosity of the mixture will continue to increase until it achieves its ultimate viscosity, that of a semi-rigid gel.

This dispersion, acidification, hydration, and yielding of the polymer and the addition of salt may be carried out on location at the well-site where it is to be used, or it can be carried out at another location than the well-site. If the well-site location is selected for carrying out this step, then the hydrated and yielded polymer and the salt may immediately be dispersed in a brine, such as, for example, a 14.2 ppg $CaBr_2$-based brine, the crosslinkant or crosslinkant activator may immediately be added, and the crosslinked product may immediately be emplaced in the well either through coiled tubing or through using a process referred to as "bull-heading".

As mentioned above, the dispersion, acidification, hydration, and yielding of the polymer and the addition of salt may be carried out either on location or at a "pre-manufacture" site remote from the well-site. There, the hydrated and yielded polymer and the salt may be dispersed in a brine, such as, for example, a 14.2 ppg $CaBr_2$-based brine, the crosslinkant activator may be added, and the crosslinked product may be packaged in 5-gallon buckets which are palletized and shipped to the well-site.

The crosslinked polymer for the fluid loss pill of the present disclosure may also be pre-formulated into a dry crosslinked polymer particulate system, and provided for use at the well-site in user friendly packaging. In particular, such a particulate based system may be formed by initially forming a batch of a crosslinked gel, such as by the methods disclosed above, shredding the crosslinked gel into small particles by extrusion, coating the shredded particles with a polymer powder, hardening the coated products by drying, and then grinding the hardened particles into a fine-grained material. Formation of such dry crosslinked polymer particles is described, for example, in U.S. Pat. No. 6,342,467, which is herein incorporated by reference in its entirety. The crosslinked polymer for the fluid loss pill of the present disclosure may also be pre-formulated into a mixture of a batch of a crosslinked gel, such as by the methods disclosed above, with a batch of crosslinked, shredded, coated, dried, and ground material.

The fluid loss pill of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. The fluid loss pill or diverting treatment may then react with the brine to form a plug near the wellbore surface (i.e., at the rock face) to significantly reduce fluid flow into the formation.

The fluid loss pill may be selectively emplaced in the wellbore, for example, by spotting the pill through a coil tube or by bullheading. A downhole anemometer or similar tool may be used to detect fluid flows downhole that indicate where fluid may be lost to the formation. The relative location of the fluid loss may be determined such as through the use of radioactive tags present along the pipe string. Various methods of emplacing a pill known in the art are discussed, for example, in U.S. Pat. Nos. 4,662,448, 6,325,149, 6,367,548, 6,790,812, 6,763,888, which are herein incorporated by reference in their entirety.

It is also within the scope of the present disclosure that one embodiment of the crosslinked polymer of the present disclosure may be formed in situ, for example, by crosslinking between a crosslinkable synthetic polymer, such as those described above, and divalent cations such as calcium present in a brine or a polyquaternized organic amine added to an oleaginous base fluid. Thus, in a particular embodiment, a calcium brine may be present in a wellbore into which a uncrosslinked or partially crosslinked synthetic polymer of the present disclosure may be emplaced, whereby upon reaction with calcium, the fluid loss pill of the present disclosure may be formed in situ. Further, this embodiment may include a bucketed product that is not crosslinked or is only partially crosslinked, but will crosslink and/or harden more fully after pumping downhole. Such crosslinking in situ may be response to reservoir conditions or fluids, exposure to a crosslinking activator pumped concurrently with or proceeding the crosslinkable polymer, and/or a delayed release crosslinking agent contained in the bucket. Such delayed release crosslinking agents may include for example, slightly soluble crosslinkant compounds or ores such as, for example, borate ores such as, for example, ulexite and calcined colemanite, delayed zirconium- or titanium-containing crosslinkants, encapsulated crosslinkants or crosslinkant activators, encapsulated activators including pH adjusters/buffers, and the like, or by incorporating a delay additive or retardant as known in the art, such as a chelating agent. Such delayed metal-containing crosslinkants, i.e., titanium-containing crosslinkants, may be formed, for example, by including an organic hydroxycarboxylic acid with an organic metal-containing complex. Further, one of ordinary skill in the art would appreciate that other delayed crosslinkants may be used, and the above-mentioned agents comprise a non-exhaustive list.

Further, once emplaced and gelled, the fluid loss pill may be optionally removed by injecting a breaker fluid into the wellbore. Suitable breaker fluids may include, for example, various acid solutions comprising hydrochloric acid, acetic acid, citric acid, formic acid, so as to convert the oxyanion groups crosslinked with the metal cations disclosed herein back into acid form. Additionally, it is also within the scope of the present disclosure that a delayed breaker may be also be used, for example, in pumping sequentially or simultaneously (on the fly) and even included in a bucketed quantity of precrosslinked polymer, such as the conventional or dry polymer described above. Such delayed breakers may include, for example, encapsulated citric acid, a hydrolyzable ester of formic or acetic acid, or an acid in solid form, such as lactic acid. One of ordinary skill in the art would appreciate that the exemplary breaker mentioned are not a limitation on the scope of the present disclosure and that one of ordinary skill in the art would appreciate other breaker materials, either conventional or delayed, may be used to convert the crosslinked oxyanion groups of the crosslinkable monomer unit(s) back into acid form.

In addition, while specific mention is made of synthetic polymers, one of ordinary skill in the art would appreciate that natural polymers such as HEC and its derivatives, guars, derivatized guars, and other similar polymers may be used in conjunction with the synthetic polymers of the present disclosure in various other embodiments of the present disclosure.

Advantageously, embodiments of the present disclosure may provide for at least one of the following. The pills of the present disclosure may allow for a crosslinked polymer possessing greater stability at various downhole conditions and greater compatibility with various types of base fluids, including various brines and oil-based or water-miscible solvents. In particular, the stability may be derived from the use of a synthetic polymer as compared to a natural polymer, which typically degrade at lower temperatures. Further, the resulting crosslinked fluid may be said to demonstrate shear-thinning and re-healing properties that provide for easy pumping downhole, which may provide good fluid loss control upon placement.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of reducing fluid loss from a wellbore, comprising:
emplacing a fluid loss pill in the wellbore, the fluid loss pill comprising:
a base fluid;
a hydratable or solvatable synthetic copolymer having at least one crosslinkable comonomer comprising a compound represented by the general formula:

where $R^1$ is an olefinically unsaturated hydrocarbon, and X is a functional group represented by $-B(O)_n(OR^2)_m$ or $-OB(O)_n(OR^2)_m$ where B is any heteroatom, n is 0-2, m is 1-2, and $R^2$ is H, $C_1$-$C_{30}$ alkyl, aryl, or aralkyl groups; and
a crosslinking agent.

2. The method of claim 1, wherein the crosslinkable comonomer is present in an amount ranging from about 0.05 to 15 weight percent of the fluid loss pill.

3. The method of claim 2, wherein the crosslinking agent comprises at least one of magnesium oxide or calcium oxide.

4. The method of claim 1, wherein the base fluid comprises at least one of fresh water, sea water, a brine containing organic or inorganic dissolved salts, a liquid containing water-miscible organic compounds, or combinations thereof.

5. The pill of claim 4, wherein the brine comprises a halide or carboxylate salt of at least one of cesium, potassium, calcium, zinc, or sodium.

6. The method of claim 1, wherein the crosslinkable comonomer comprises at least one of vinyl phosphonic acid, vinyl sulfonic acid, vinyl arsonic acid, vinyl selenonic acid, vinyl benzoic acid, acrylic acid, or dervatives thereof.

7. The method of claim 1, wherein the copolymer comprises at least one of poly(ethylene glycol), poly(diallyl amine), poly(acrylamide), poly(acrylonitrile), poly(aminomethylpropylsulfonate), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), and or poly(vinyl lactam).

8. The method of claim 1, wherein the copolymer comprises at least one other monomer selected from at least of ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, or vinyl lactam.

9. The method of claim 1, wherein the copolymer comprises at least one other monomer selected from at least one of an ester of acrylic or methacrylic acid, a vinyl ester of an alkyl acid, a vinyl alkyl ether, ethylene, propylene, butadiene or isoprene, a hydroxyl group-containing fatty acid, poly-t-butyl styrene terminated with amine, hydroxyl, carboxyl or unsaturated groups, or polyisobutylene, polybutadiene or polyisoprene terminated with amine, hydroxyl or carboxyl groups, or polymers of methyl or ethoxyethyl methacrylate, ethyl acrylate, styrene or vinyl toluene.

10. The method of claim 1, wherein the copolymer comprises at least one of aliphatic polyethers, polyesters from difunctional acids and alcohols, alcohol esters of acrylic or methacrylic acids, or polymers of hydroxy-acids.

11. The method of claim 1, wherein the copolymer comprises at least one other monomer selected from at least one of acrylic or methacrylic acids, ethylene oxide or vinyl pyrrolidone, polyvinyl alcohol or polymers of glycerol or glycol monomethacrylates.

12. The method of claim 1, wherein the crosslinkable comonomer is present in an amount ranging from about 0.5 to 2 weight percent of the fluid loss pill.

13. The method of claim 1, wherein the crosslinking agent comprises at least one divalent cation source.

14. The method of claim 1, wherein the crosslinking agent comprises a poly-quaternized organic amine.

15. The method of claim 1, wherein the base fluid comprises at least one of diesel oil, mineral oil, synthetic oil, ester oils, glycerides of fatty acids, aliphatic esters, aliphatic ethers, aliphatic acetals, or combinations thereof.

16. The method of claim 1, wherein the base fluid comprises at least one of an alcohol or a glycol.

17. The method of claim 1, wherein the fluid loss pill comprises a pre-crosslinked gelled composition.

18. The method of claim 1, wherein the fluid loss pill comprises a partially crosslinked gelled composition.

19. The method of claim 1, further comprising:
allowing a sufficient amount of time for the crosslinking agent to crosslink the hydratable or solvatable synthetic copolymer in the wellbore.

20. The method of claim 1, wherein the at least one crosslinkable comonomer is incorporated into the hydratable or solvatable synthetic copolymer by copolymerization.

21. A fluid loss pill, comprising:
a crosslinked gelled composition, comprising:
a base fluid;
a hydratable or solvatable synthetic copolymer having at least one crosslinkable comonomer comprising a compound represented by the general formula:

where $R^1$ is an olefinically unsaturated hydrocarbon, and X is a functional group represented by $-B(O)_n(OR^2)_m$ or $-OB(O)_n(OR^2)_m$ where B is any heteroatom, n is 0-2, m is 1-2, and $R^2$ is H, $C_1$-$C_{30}$ alkyl, aryl, or aralkyl groups; and
a crosslinking agent.

22. A method of treating a wellbore through a permeable subterranean formation, comprising:
preparing a crosslinked aqueous gelled composition comprised of an aqueous salt solution having a density in the range of from about 11 to about 21.5 pounds per gallon, a hydratable and crosslinkable synthetic copolymer having as a comonomer a vinyl phosphonic acid or derivative thereof and a crosslinking agent;
emplacing the high density cross-linked aqueous gelled composition in the wellbore in an amount sufficient to fill the portion of the wellbore within the permeable subterranean formation; and
emplacing a high density completion fluid in the wellbore behind the high density cross-linked gelled composition therein whereby the cross-linked gelled composition prevents the completion fluid from being lost into the permeable subterranean formation.

23. The method of claim 22, wherein the crosslinking agent comprises at least one divalent cation source.

24. The method of claim 23, wherein the crosslinking agent comprises at least one of magnesium oxide or calcium oxide.

25. The method of claim 22, the an aqueous fluid comprises at least one of fresh water, sea water, a brine containing organic or inorganic dissolved salts, a liquid containing water-miscible organic compounds, or combinations thereof.

26. The method of claim 25, wherein the brine comprises a halide or carboxylate salt of at least one of cesium, potassium, calcium, zinc, or sodium.

27. The method of claim 22, wherein the copolymer comprises at least one of poly(ethylene glycol) (PEG), poly(diallyl amine), poly(acrylamide), poly(acrylonitrile), poly(aminomethylpropylsulfonate), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), or poly(vinyl lactam).

28. The method of claim 22, wherein the copolymer comprises at least one other monomer selected from at least of ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, or vinyl lactam.

29. The method of claim 22, wherein the vinyl phosphonic acid comonomer is present in an amount ranging from about 0.05 to 15 weight percent of the fluid loss pill.

30. The method of claim 22, wherein the vinyl phosphonic acid comonomer is present in an amount ranging from about 0.5 to 2 weight percent of the fluid loss pill.

\* \* \* \* \*